United States Patent [19]

Shaffer et al.

[11] Patent Number: 5,895,988
[45] Date of Patent: Apr. 20, 1999

[54] SAFETY SYSTEM FOR AN ELECTRONIC DEVICE HAVING MULTIPLE POWER INPUTS

[75] Inventors: Shmuel Shaffer, Palo Alto; William J. Beyda, Cupertino; Peter Kozdon, Santa Clara, all of Calif.

[73] Assignee: Siemens Business Communication Systems, Inc., Santa Clara, Calif.

[21] Appl. No.: 08/921,744

[22] Filed: Aug. 21, 1997

[51] Int. Cl.⁶ ............................................. H02H 3/04
[52] U.S. Cl. ........................... 307/126; 307/326; 361/62; 361/63; 361/64
[58] Field of Search ............................ 307/126, 125, 307/110, 328, 326; 361/62, 63, 64; 340/649, 651, 652, 653

[56] References Cited

U.S. PATENT DOCUMENTS

| | | | |
|---|---|---|---|
| 2,993,148 | 7/1961 | Pywell | 361/63 |
| 3,626,248 | 12/1971 | Bartlett | 340/652 |
| 3,646,354 | 2/1972 | Von Brimer | 307/328 |
| 4,389,694 | 6/1983 | Cornwell | 340/652 |
| 5,412,528 | 5/1995 | Mäder et al. | 361/62 |
| 5,563,455 | 10/1996 | Cheng | 307/41 |
| 5,565,714 | 10/1996 | Cunningham | 307/126 |

*Primary Examiner*—Albert W. Paladini

[57] ABSTRACT

A safety system for electronic devices having multiple power inputs includes dedicating a different power detector to each power input and includes disabling all of the power inputs upon detection that one input has been disabled. Each of the power inputs is typically a power cord that provides electrical energy to a discrete electrical circuit. Thus, the safety system permits the electronic device to use a different power supply for each electrical circuit, while ensuring that there is no erroneous assumption that disconnecting one of the power cords will de-energize the entire electronic device. In the preferred embodiment, the paths to the power supplies are disabled by opening relay switches, with the switches that are specific to a power cord being in a logical AND arrangement.

18 Claims, 3 Drawing Sheets

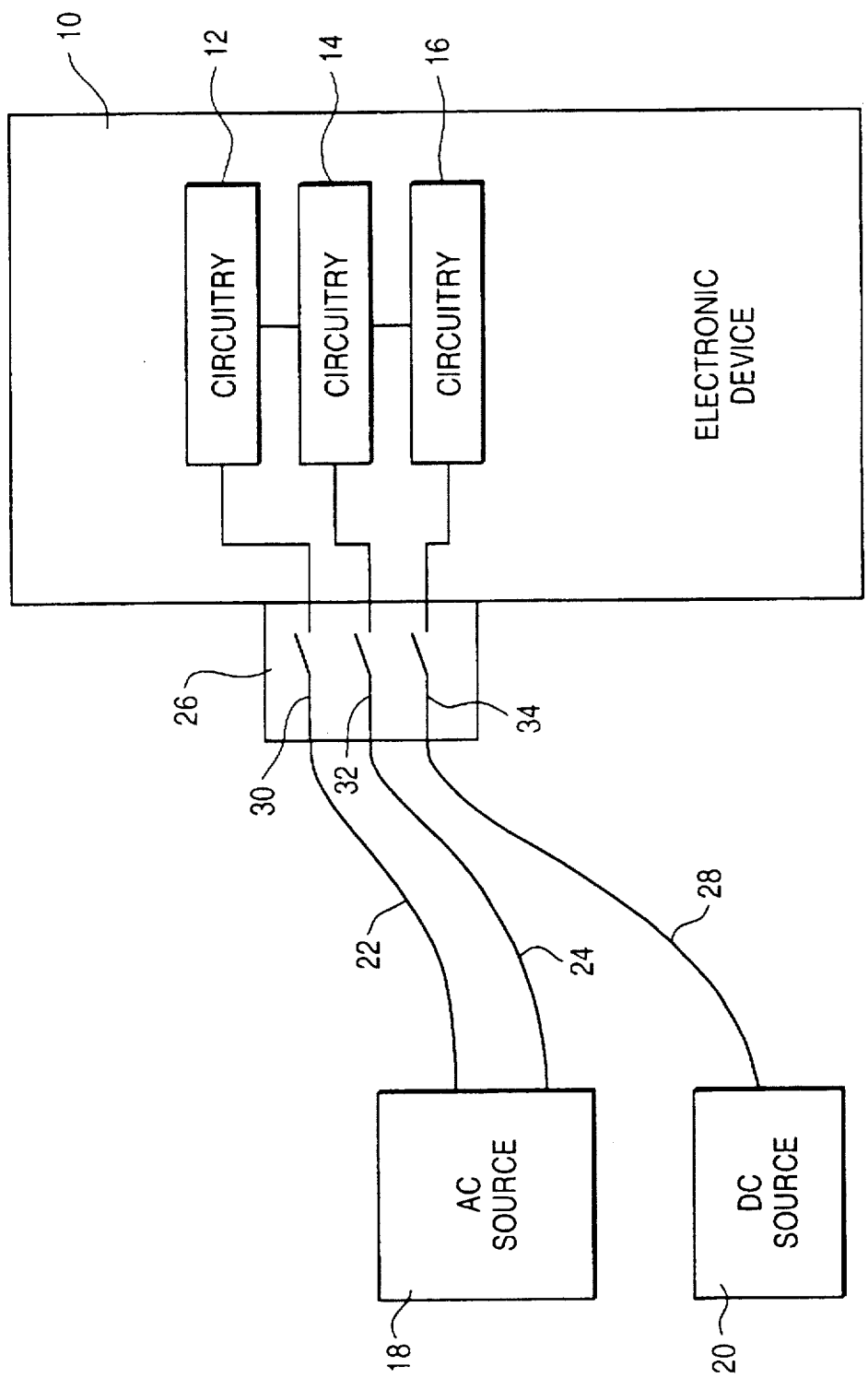

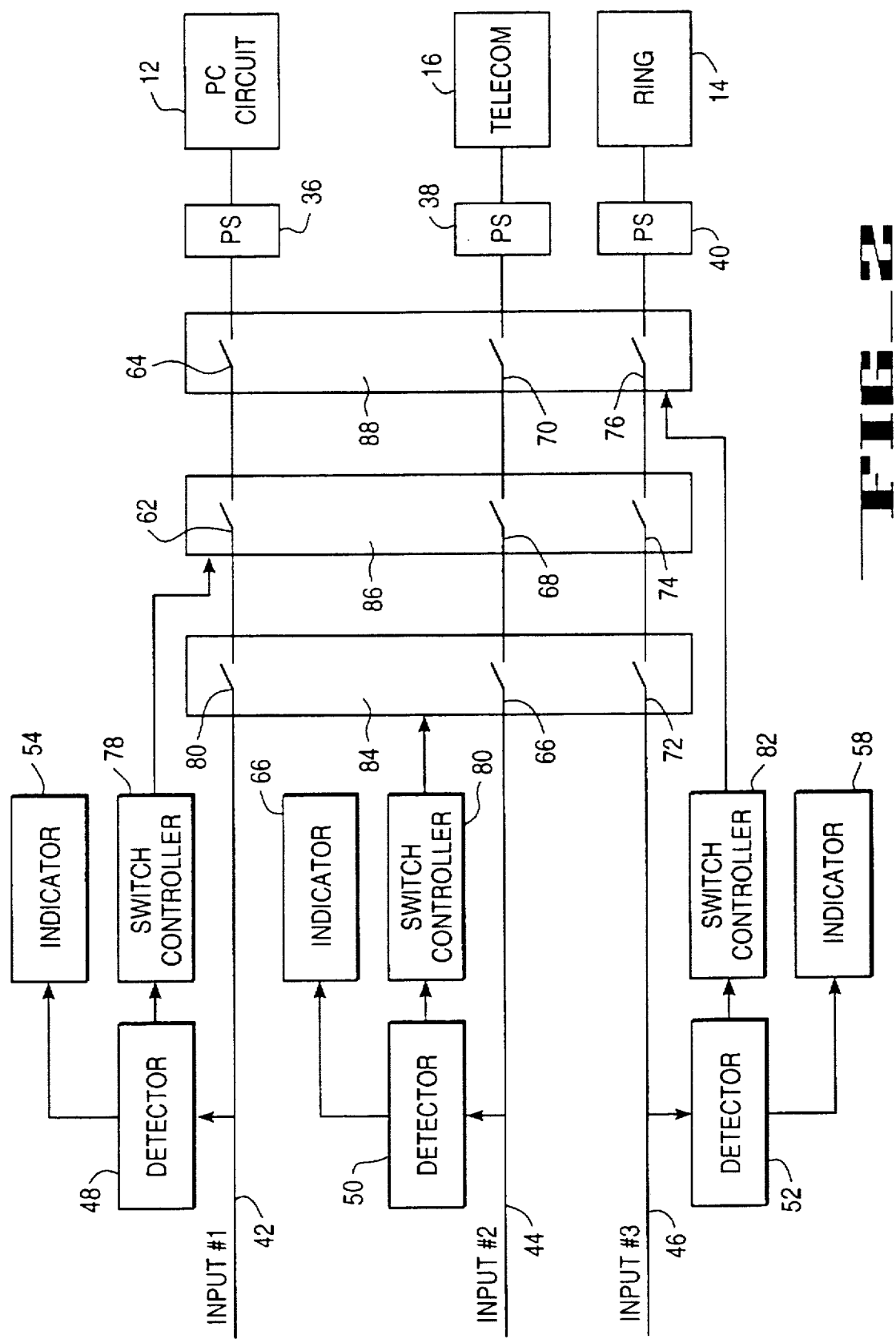

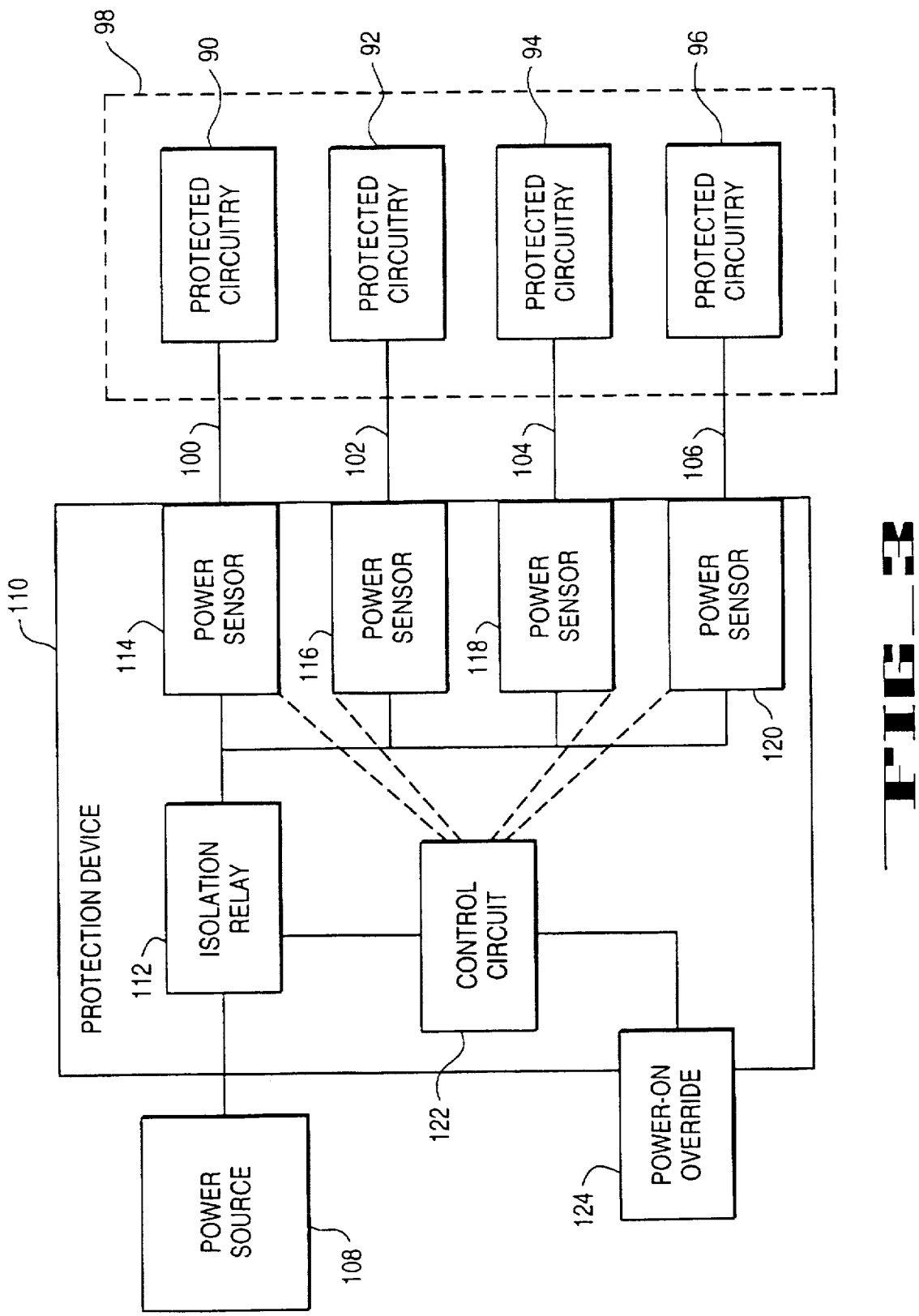
FIG_3

SAFETY SYSTEM FOR AN ELECTRONIC DEVICE HAVING MULTIPLE POWER INPUTS

BACKGROUND OF THE INVENTION

The invention relates generally to safety systems and more particularly to reducing the likelihood of an electrical shock or device damage in systems having more than one power cord.

DESCRIPTION OF THE RELATED ART

During an upgrade or repair procedure for an electronic device, such as a personal computer, it is often necessary to remove a portion of the housing of the device. As an example, a computer upgrade that includes installing an add-on printed circuit board requires the computer owner or technician to remove a cover panel in order to gain access to the interior of the computer. This exposes the person to the risk of electrical shock which may cause injury. Merely placing the power switch of the electronic device in an "off" condition does not eliminate the risk, since power still enters the interior of the device. Therefore, many devices include exterior warnings to disconnect a power cord prior to exposing the interior of the device.

While most electronic devices utilize a single power cord, there are sometimes advantages to utilizing multiple power cords. As an example, a personal computer may be adapted to support telecommunications access to a number of telephones and other telecommunications devices of a small business. The resulting personal computer-based telecommunications may utilize the standard personal computer power supply to provide the various logic voltages, may use a separate power supply to provide 48 volts DC for operation of installed telephony cards, and may have an input of 60–90 volts AC for ring circuitry.

It is significantly less expensive to utilize independent power supplies to provide the necessary voltage requirements for the various components, than it would be to design and manufacture a custom universal power supply. However, one concern is that a user or a service technician will disconnect one power cord for one of the power supplies under the assumption that the disconnection completely de-energizes the electronic device. When the housing of the device is then opened, the person will initiate an upgrade or service procedure without realizing that the device is energized, in part or in whole, by the other power cords. Thus, the person is susceptible to a potentially dangerous electrical shock.

Governmental and commercial safety agencies require specific warnings on the labeling and the documentation of some electronic devices. However, it is not uncommon for a user or technician to intentionally or unintentionally disregard the labeling and documentation. Therefore, there are still risks associated with use of multiple power cords. Fearing the legal consequences, manufacturers may select the alternative of manufacturing a more expensive universal power supply that requires a single power cord.

A comparable application is one in which a number of devices interact to achieve a single purpose. For example, different robotic devices may be used in a manufacturing facility to fabricate a component, such as a printed circuit board having an array of integrated circuit chips. Each robotic device may be responsible for supplying and placing a portion of the integrated circuit chips. Upon completion of one printed circuit board, a different board is moved into position to receive the chips from the pick-and-place robotic devices. However, if one robotic device terminates operation, the assembly process may continue for some time before the problem is detected. All of the partially assembled boards must then be retrieved, so that the missing chips may be hand seated.

What is needed is a safety system that may be used to protect service technicians and other persons who enter the interior of an electronic device having more than one power input. What is further needed is a system that may be used to protect the equipment itself.

SUMMARY OF THE INVENTION

A safety system for an electronic device having more than one power cord that is connected to an external power source includes forming a logical AND arrangement for inputs from the power cords, so that when one cord is disconnected, all of the paths from the cords to circuitry within the electronic device are disconnected. The electronic device includes a housing and at least two electrical circuits having separate inputs for receiving power. The power cords include a first cord that forms at least a portion of a path from an external power source to the input of the first electrical circuit. The power cords further include a second cord that forms at least a portion of a path from an external power source to the input of the second electrical circuit. Power detectors are connected to sense a condition in which one of the power cords is detached. Upon detection of such a condition, the remaining paths from the external power source or sources to the internal electrical circuits are automatically disabled.

In the preferred embodiment, there is a one-to-one correspondence between power cords and voltage detectors that are connected to a switching arrangement for automatically disabling the paths to the internal circuitry. The switching arrangement may be a relay that disconnects the power connections when one of the voltage detectors senses that the voltage level at its corresponding power cord is below a preselected threshold voltage level. In one embodiment, the first electrical circuit is computer circuitry and the second electrical circuit is telecommunications circuitry. The safety circuit that automatically disables the power paths may be contained within an enclosure attached to the housing for the electrical circuits or may be contained within the housing. Preferably, the safety circuit is accessible only by means of a special purpose tool, so that the safety circuit cannot be disabled. Optionally, a visual indicator is included to identify the presence of a condition in which all of the paths are to be disabled.

In another embodiment of the invention, each power cord is connected to a power input of a different electrical circuit and the detectors are current sensors. A switching arrangement is responsive to the detectors for terminating current flow to all of the power cords upon detection that a current level to one of the power cords is below a threshold current level. In this embodiment, the electrical circuits are not necessarily contained within a single housing.

BRIEF DESCRIPTION OF THE DRAWINGS

FIG. 1 is a block diagram of an electronic device and safety circuit connected to external power sources in accordance with the invention.

FIG. 2 is a block diagram of one embodiment of the safety circuit of FIG. 1, shown in telecommunications application.

FIG. 3 is another embodiment of a safety circuit in accordance with the invention.

DETAILED DESCRIPTION

With reference to FIG. 1, an electronic device 10 is shown as having three separate internal circuits 12, 14 and 16. In one embodiment, the device 10 is a personal computer-based communications system having standard computer circuitry 12, telephony cards 16, and telephone ring circuitry 14. The three circuits will have separate power requirements. Standard PC power supplies require an AC input (e.g., 110 volts AC), the ring circuitry may have a lower AC requirement (e.g., 60–90 volts AC), and the telecom circuitry may have a DC requirement (e.g., 48 volts DC). A single power supply may be custom designed and manufactured to supply all of the necessary voltages, so that a single power cord may be utilized with the device. However, this is an expensive alternative when compared to utilizing three separate, but standard, power supplies. The electronic device of FIG. 1 utilizes the less expensive alternative of providing separate power inputs to the three circuits.

The first and second circuits 12 and 14 receive an input from an AC source 18, while the third circuit 16 receives power from a DC source 20. However, other power input arrangements may be used with the invention. The AC source 18 may be a conventional wall socket connection to 110 volts AC or 220 volts AC. Power cords 22 and 24 extend from the AC source to an enclosure 26 mounted to the housing of the electronic device 10. Preferably, access to the interior of the enclosure 26 is possible only with a special purpose tool. This restricted access reduces the likelihood that a person will disable the safety feature to be described below. As an alternative to requiring a special purpose tool, access may be restricted by providing a key lock arrangement for the enclosure 26.

As previously noted, the safety hazard associated with the use of more than one power cord to operate a single electronic device is that a person may unplug one cord and assume that the device has been completely de-energized. In FIG. 1, if one power cord 22 is detached at either the distal end that is connected to the AC source 18 or at the proximal end connected to the enclosure 26, the other power cord 24 will remain as a potential path from the AC source 18 to the internal circuitry 14 of the electronic device. Moreover, a connection to a third power cord 28 remains intact to potentially provide a path from the DC source 20 to internal circuitry 16.

The safety hazard is addressed by utilizing voltage detectors and interlinked switches to ensure that disconnecting one of the power cords 22, 24 and 28 disables all the paths from the sources 18 and 20 to the internal circuitry 12, 14 and 16. The voltage detectors are not shown in FIG. 1, but the power cords are shown as having a one-to-one correspondence with switches 30, 32 and 34 within the enclosure 26. The switches may be "ganged" in any known fashion. For example, as will be described more fully below, the switches may be contacts of relays that are responsive to the voltage detectors.

While the enclosure 26 is shown as an external unit, the safety circuit may be contained within the housing of the electronic device 10. Referring now to FIG. 2, the three internal circuits 12, 14 and 16 are shown connected to different power supplies 36, 38 and 40. Current to the different power supplies is provided by inputs 42, 44 and 46. Comparing FIGS. 1 and 2, the inputs are paths from the AC and DC sources 18 and 20. The inputs may be the power cables 22, 24 and 28 themselves, or may be connections from the power cords.

Each input 42, 44 and 46 is connected to a detector 48, 50 and 52, respectively. The type of detector is not critical to the invention. The detector will be referred to herein as a "voltage detector," which is defined as including circuits that achieve current-to-voltage conversion or voltage-to-current conversion. If the voltage level along an input 42, 44 and 46 associated with one of the detectors drops below a preselected voltage level, a visual indicator 54, 56 and 58 is activated. In its simplest form, the indicators are lamps, such as light emitting diodes (LEDs). The indicators provide visual evidence that the safety circuit has detected a power-down condition. Also in the simplest embodiment, the preselected threshold level is a nominal voltage or current, so that the safety circuit performs its protective function only when one of the inputs is disconnected from its associated external power source. However, utilization of the invention with higher threshold voltage levels is contemplated.

The path from the first input 42 to the power supply 36 of the PC circuit 12 includes three switches 60, 62 and 64. If any one of the switches is electrically opened, the input 42 will be isolated from the power supply 36. That is, the three switches form a logical AND arrangement. For convenience, each of the three switches is shown in the open condition in FIG. 2. Referring briefly to FIG. 1, the switch 30 represents the three switches 60, 62 and 64 of FIG. 2.

The switch 32 in FIG. 1 also represents three switches 66, 68 and 70 in FIG. 2. If any one of the three switches is electrically opened, the path between the second input 44 and the power supply 38 of the internal telecom circuitry 16 is disabled. For purposes of illustration, the three switches are all shown in the open condition.

The switch 34 within the enclosure 26 of FIG. 1 represents three switches 72, 74 and 76 along the path between the third input 46 and the power supply 40 of the internal ring circuitry 14 in FIG. 2. Again, for purposes of illustration, all three of the switches are shown in an open condition, but opening any one switch will break the path between the input 46 and the power supply 40.

Each of the detectors 48, 50 and 52 is linked to a switch controller 78, 80 and 82. The switch controller 80 of the detector 50 determines whether switches 60, 66 and 72 are in an electrically open condition or an electrically closed condition. The three switches are ganged, so that a changing condition is achieved simultaneously. In the preferred embodiment, the switch controller 80 determines the condition of an isolation relay 84. When the detector 50 determines that the voltage/current level along the second input 44 is below the preselected threshold level, the switch controller 80 de-energizes the isolation relay 84 and the three switches 60, 66 and 72 open. Consequently, all of the three paths to the power supplies 36, 38 and 40 are disabled. It follows that when the power cord 28 to the telecom circuitry 16 in FIG. 1 is disconnected, the electronic device 10 is completely de-energized.

Switches 62, 68 and 74 of FIG. 2 are ganged and are controlled by a switch controller 78 that is responsive to the detector 48. The ganged switches may be contacts of an isolation relay 86. When it is determined that the voltage/current level along the first input 42 is below a preselected level, the output of the detector 48 causes the switch controller 78 to open all three of the ganged switches 62, 68 and 74, thereby breaking the paths to all three of the power supplies 36, 38 and 40.

A similar arrangement applies to the ganged switches 64, 70 and 76 that may be contacts of a third isolation relay 88. The switch controller 82 triggers the activation of the isolation relay in response to determination by the detector 52 that the third input 46 is at a voltage/current level that is below a preselected threshold level. The interconnections of the isolation relays 84, 86 and 88 provide a logical AND operation for energizing the circuitry 12, 14 and 16 within the interior of the electronic device 10. Because the three switches to any one of the power supplies 36, 38 and 40 are in electrical series, disconnecting any one of the three power cords 22, 24 and 28 opens all three paths to the power supplies. Consequently, a service technician or owner of the electronic device will not erroneously assume that disconnecting one of the power cords completely de-energizes the electronic device.

Re-energization of the device occurs when all three of the inputs 42, 44 and 46 have a voltage level above their preselected threshold voltage levels. When the detector 48 senses that the input 42 is connected to the power source, switches 62, 68 and 74 are electrically closed. Switches 60, 66 and 72 are closed when detector 50 determines that the input 44 is connected to a power source. Likewise, switches 64, 70 and 76 are closed when detector 52 determines that the voltage level along the input 46 is above the threshold voltage level.

A second embodiment of the safety circuit is shown in FIG. 3. In one application of the safety circuit, the "protected circuitry" 90, 92, 94 and 96 is contained within a single housing 98. As in FIG. 1, one circuit may be PC circuitry, a second circuit may be telecom circuitry, and the other circuits may be support circuitry (e.g., a ring circuit). Each of the four circuits 90, 92, 94 and 96 is powered by a separate power cord 100, 102, 104 and 106. Thus, without a safety circuit, disconnection of one of the power cords does not completely de-energize circuitry contained within the housing 98.

Rather than each of the four power cords 100–106 being connected directly to a power source 108, the power cords are connected to a protection device 110 which is linked to the power source 108. As shown in FIG. 3, each connection of a power cord with a power source is a series circuit that includes a universal isolation relay 112 and a dedicated power sensor 114, 116, 118 and 120. In one embodiment, each power sensor is a current sensor that detects whether there is current flow from the power source 108 to the protected circuitry 90–96 of the dedicated power cord 100–106. Outputs of the power sensors are connected to a control circuit 122. When the output of any one of the power sensors transmits a signal to the control circuit that the current level is below a threshold current level, the control circuit 122 opens the contact of the isolation relay 112, so that none of the protected circuitry 90–96 receives power. As a result, a person who enters the interior of the electronic device is protected if any one of the four power cords 100–106 is disconnected.

Re-energization of the electronic device may be accomplished using a power-on override 124. The power-on override is used to allow current to pass to all of the power sensors 114–120 before the control circuit 122 is activated to open the isolation relay 112 in response to a low-current condition at one of the four power sensors. Alternatively, the power-on override 124 may be used to override the four power sensors. Preferably, the power-on override 124 is a push-to-make switch which requires constant pressure to maintain the override state. This reduces the likelihood that a person will use the power-override to disable the protective function of the device 110.

The embodiment of FIG. 3 is best utilized when all of the protected circuits 90–96 of a device are connected to a single power source 108, such as an AC outlet. While the protected circuits are shown as being contained within a single device, this is not critical. The protected circuits may be circuits in devices that interact to achieve a single purpose. For example, each of the four circuits 90–96 may be a discrete robotic device used in the assembly of a printed circuit board having an array of integrated circuit chips. Each of the four robotic devices may be responsible for supplying and placing a different integrated circuit chip by connecting the circuits in the manner shown in FIG. 3. If one of the four circuits is disabled, the other four circuits will be disabled. This prevents partially assembled printed circuit boards from being fabricated until the malfunction is discovered.

What is claimed is:

1. An electronic device comprising:

a housing;

a first electrical circuit enclosed within said housing, said first electrical circuit having a first input for receiving power;

a second electrical circuit enclosed within said housing, said second electrical circuit having a second input for receiving power;

a plurality of power cords having distal ends for independent and detachable connection to at least one power source that is external to said housing and having proximal ends, said power cords including a first power cord having a proximal end connected such that said first power cord forms at least a portion of a first path between said first input and said at least one external power source, said power cords further including a second power cord having a proximal end connected such that said second power cord forms at least a portion of a second path between said second input and said at least one external power source; and an electrical safety circuit means for automatically disabling both of said first and second paths in response to detection of a condition in which one of said distal and proximal ends of at least one of said plurality of power cords has been detached, thereby disabling said first and second electrical circuits, said electrical safety circuit means including power detectors connected to sense said condition.

2. The device of claim 1 wherein said power detectors are voltage detectors having a one-to-one correspondence with said plurality of power cords such that there is a voltage detector dedicated to each power cord.

3. The device of claim 1 wherein said electrical safety circuit means includes a relay circuit responsive to each power detector such that said relay circuit is tripped in response to detection of said condition.

4. The device of claim 1 wherein said first electrical circuit includes a first power supply and wherein said second electrical circuit includes a second power supply isolated from said first power supply.

5. The device of claim 1 wherein said first electrical circuit is computer circuitry and wherein said second electrical circuit is telecommunications circuitry.

6. The device of claim 1 wherein said electrical safety circuit means is contained within said housing.

7. The device of claim 1 wherein said electrical safety circuit means is contained within an enclosure attached to said housing.

8. The device of claim 7 wherein each proximal end of said plurality of power cords is attached to said enclosure.

9. The device of claim 1 wherein said electrical safety circuit means includes a visual indicator that is responsive to said power detectors to visually identify presence of said condition.

10. A safety system comprising:

a protected electronic device having a plurality of independent power supplies contained within a single housing;

a plurality of load circuits independently driven by said independent power supplies;

a plurality of power cords extending from said housing for attachment to external power sources for energizing said power supplies, each power cord being associated with one of said power supplies to provide an input thereto, each said load circuit thereby being energized by a dedicated one of said power cords and a dedicated one of said power supplies;

an array of voltage detectors having a one-to-one correspondence with said power cords, each voltage detector being connected to monitor a voltage level indicative of said input of said power cord with which said each voltage detector corresponds; and switching means responsive to said array of voltage detectors for disabling operation of said protected electronic device upon detection that said voltage level of at least one input is below a threshold voltage level selected therefor, said switching means being connected to automatically disconnect all of said inputs upon said detection.

11. The safety system of claim 10 wherein said load circuits include telecommunications circuitry, at least one of said power supplies being dedicated to providing power to said telecommunications circuitry.

12. The safety system of claim 10 wherein said power cords extend from said protected electronic device and have distal ends for detachable connections to said external power sources, including an AC line source.

13. The safety system of claim 10 wherein said switching means is an array of relays connected in an electrical series arrangement such that an active-inactive condition of each relay controls all of said inputs.

14. The safety system of claim 10 wherein said voltage detectors and said switching means are contained within a unit connected to said protected electronic device.

15. A safety system comprising:

a housing;

a plurality of independent electrical circuits within said housing, each electrical circuit having a power input;

a plurality of power cords having a one-to-one correspondence with said electrical circuits to provide power thereto;

at least one power source selectively connected to each of said power cords at ends opposite to said electrical circuits, each power source being external to said housing;

an array of detectors connected to sense current flow from each said power source to said electrical circuits via said power cords; and switching means responsive to said detectors for terminating current flow through all of said power cords upon detection that a current level to at least one of said power cords is below a threshold current level selected for said at least one of said power cords.

16. The safety system of claim 15 wherein said switching means includes an isolation relay and a relay control circuit that is responsive to said detectors.

17. The safety system of claim 15 wherein said detectors are current sensors.

18. The safety system of claim 15 further comprising a power-on circuit connected to deactivate said switching means when said power-on circuit is activated.

* * * * *